United States Patent [19]
Talbot

[11] 3,886,718
[45] June 3, 1975

[54] AUTOMATIC HEADER HEIGHT CONTROL SYSTEM FOR COMBINES AND THE LIKE

[76] Inventor: John M. Talbot, P.O. Box 9, Numa, Iowa 52544

[22] Filed: May 17, 1974

[21] Appl. No.: 470,921

[52] U.S. Cl. .............................................. 56/208
[51] Int. Cl. ........................................... A01d 67/00
[58] Field of Search ..................... 56/208, 209, 214

[56] References Cited
UNITED STATES PATENTS

| | | | |
|---|---|---|---|
| 3,238,709 | 3/1966 | Williams | 56/208 |
| 3,309,852 | 3/1967 | Allen | 56/208 |
| 3,417,555 | 12/1968 | Watkins et al. | 56/208 |
| 3,707,834 | 1/1973 | Schumaker | 56/208 |

*Primary Examiner*—Louis G. Mancene
*Assistant Examiner*—Robert F. Cutting
*Attorney, Agent, or Firm*—Haven E. Simmons; James C. Nemmers

[57] ABSTRACT

A control system for agricultural machines, such as a combine with a floating cutter bar attached, employs a set of independently operable sensors which are spaced along the grain table or header and responsive to the distance between the cutter bar at spaced points therealong and the header thereabove. An electrical and electronic control circuit in conjunction with the sensors raises the header in the event any sensor detects a distance between the cutter bar and the header less than a predetermined minimum, or lowers the header in the event all of the sensors detect distances between the two greater than a predetermined maximum.

15 Claims, 6 Drawing Figures

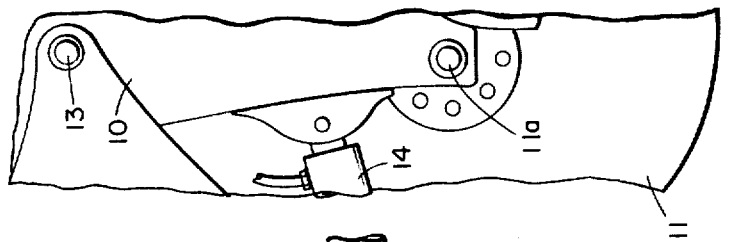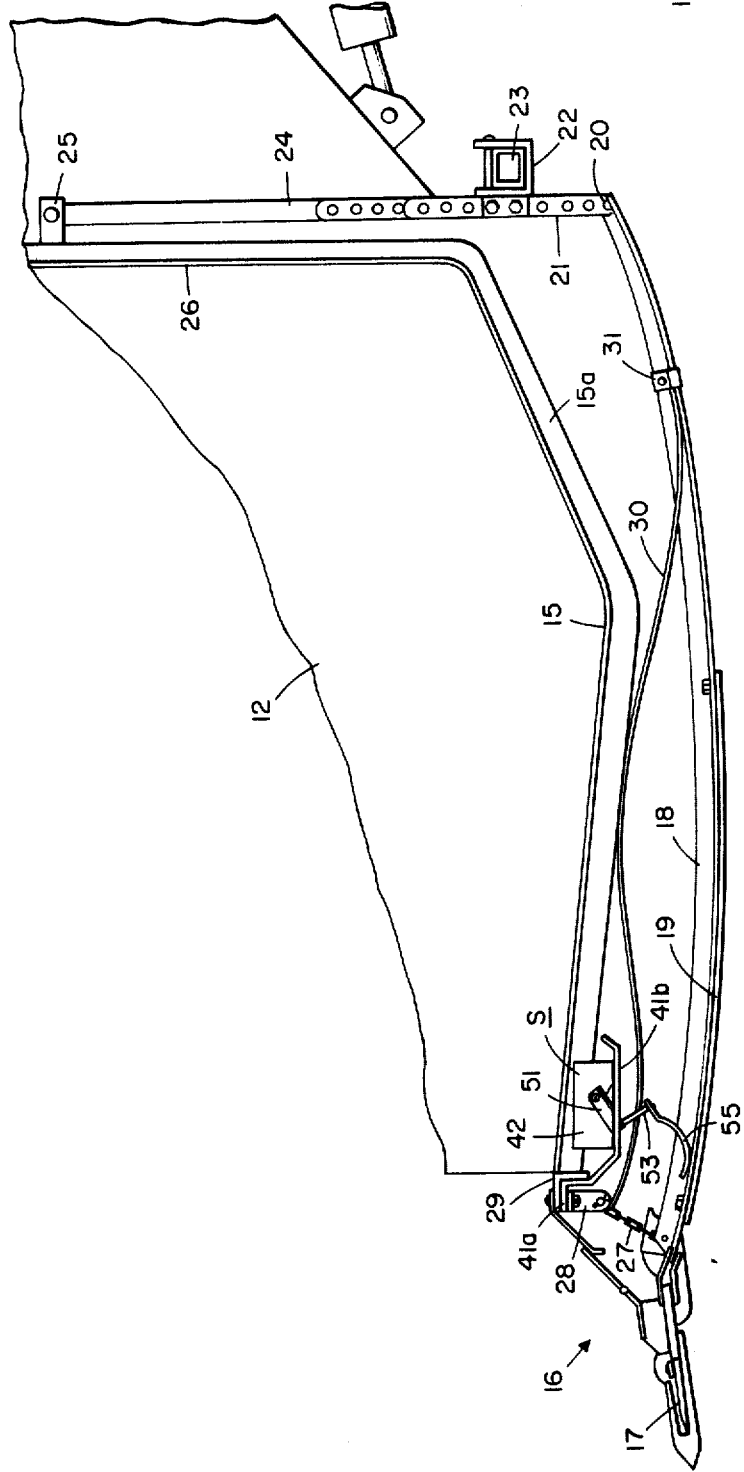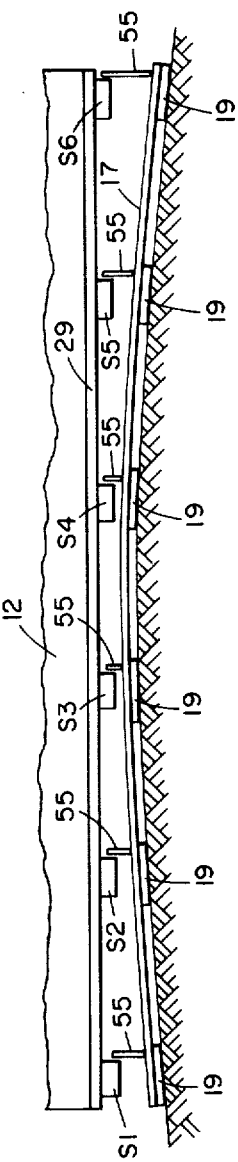

AUTOMATIC HEADER HEIGHT CONTROL SYSTEM FOR COMBINES AND THE LIKE

BACKGROUND OF THE INVENTION

Floating cutter bars are typically used as optional attachments to combine for harvesting of crops, such as soybeans, close to the ground. The bar usually rides along the ground on shoes or skids and is tranversely suspended from the combine grain table or header so that it floats relative to the latter, whereby up and down movement of the combine and header, or of the cutter bar alone, caused by uneven terrain can be accommodated within limits without the cutter bar being lifted off of or digging into the ground. In the former case, of course, the bar would then miss some of the crops and in the latter would strike the so-called "header angle" from which it is suspended, typically by chains. Often, however, the floating suspension of the cutter bar is sufficient to accommodate pitching movement of the header of rise and fall of the bar alone so that the header itself, which is pivoted to the main body of the combine, must be raised or lowered to restore the floating action of the bar. On the one hand, this has been and can be done by the operator manually controlling the hydraulic rams by which the height of the header is usually adjusted. On the other hand, that obviously requires the operator's close attention, which is not always constantly available, besides being not very efficient or reliable since the cutter bar itself is usually flexible in the vertical plane so that its distance from the header angle is apt to be continually changing throughout its length.

There have been several attempts, therefore, to provide some sort of automatic control for the height of the combine header when a floating cutter bar is attached. One well known system is shown basically in U.S. Pat. 2,750,727 to Wright. There are a number of feelers extend down from the cutter bar along its length and ride on the ground, their upper ends being fixed to a common rock shaft running the length of the cutter bar which operates an electric motor or a hydraulic valve to control header height. When the distance of the bar from the ground at all feeler locations becomes greater than a prescribed maximum, the feelers drop sufficiently to rotate the rock shaft in one direction so that the header is caused to lower. Should the distance of the bar from the ground at any one feeler location become less than a prescribed minimum, that feeler rotates the shaft in the opposite direction to cause the header to lift. In between is a "neutral" zone in which movement of the feelers does not affect the height of the header. Later modifications allow the feelers to ride on skids or shoes supporting the cutter bar just above the ground rather than on the ground itself, the rock shafts controlling header height through various mechanical, hydraulic or electrical interconnections or combinations of these.

But several deficiencies in present systems have emerged, the principal one being that they allow only a relatively limited amount of the "float" of the cutter bar to be used. Suppose, for example, that the suspension of the bar permits it to float over a distance of 6 inches beneath the header angle. With the previous systems, it is usually necessary that the "neutral" point be about half-way between the minimum and maximum, thus restricting float of the bar to only about 3 inches above and below the neutral point, that is to say, the bar can drop at one or both of its ends only 3 inches instead of a more desirable 5 to 6 inches before the header need be lowered. This restriction in turn stems from the fact that not only is the cutter bar flexible but also to some extent is the header angle and the other portions of its suspension, so that as the bar moves across the terrain the distance between the bar and the header angle is constantly changing at all points along their respective lengths. The feelers, on the other hand, when all fixed to a common rock shaft, respond collectively instead of individually and hence the position of any one is influenced by the positions of all the others, the summary result of which at any point along the cutter bar is only a kind of average of the distances of the bar from the header angle at all feeler locations rather than an accurate measure of that distance at any one location. This lack of sensitivity, plus the fact that the rock shaft itself also flexes and tends to bind somewhat at is journals along the bar, makes it impossible to put the "neutral" point of the cutter bar close to the header angle so that there is maximum available downward float. Consequently, the neutral position of the bar must be further down from the header angle in order for the system to function. Contributing to this is the fact also that the typical mechanical connections between the rock shaft and the remainder of the header height control system tend to produce only a relatively slow response of the latter to movement of the feelers and so cannot accommodate a "neutral" location of the bar close to the header angle without the risk of the two striking each other in the event the bar encounters a rise in the ground.

Accordingly, the primary object of the present invention is to provide a control system for floating cutter bars and the like in which the bar can be maintained close to the header angle, yet is sensitive and quick enough to adjust header height if necessary in response to ground levels encountered by the bar at diverse points therealong.

SUMMARY OF THE INVENTION

Essentially the invention consists of a number of sensors attached to the header angle of the floating cutter bar assembly at spaced locations along the length of the bar. Each sensor operates wholly independently of all the others and comprises a depending, spring loaded feeler which rides atop one of the shoes or skids upon which the bar is supported on the ground. The feeler operates a single pole, double throw switch sealed within each sensor, one of the two extreme positions of each switch being denoted the "raise" position and the other the "lower" position, an intermediate position being denoted the "neutral" position. The "raise" positions of all the sensors are tied electrically to into an OR gate formed by a set of transistors, one for each switch "raise" position, while the "lower" positions of all sensors are tied into an AND gate formed by another set of transistors, also one for each switch "lower" position. The outputs of the two gates are fed through suitable amplifiers and led to a pair of solenoids controlling a valve governing the hydraulic rams which typically raise and lower the combine header depending upon which solenoid is energized. Hence when the cutter bar rises at any one sensor location sufficiently to move its switch from its neutral to its "raise" position, the OR gate in turn activates the "raise" solenoid of the valve controlling the header to raise the latter until the "neutral" position of the sensor is restored. Similarly, when the cutter bar drops sufficiently at all sensor locations so that all the switches are moved from their "neutral" to their "lower" positions, the AND gate in turn activates the "lower" solenoid of the valve to lower the header until the "neutral" position of any one sensor is restored.

The foregoing operation of the system is denoted the "auto" mode and is controlled by a mode selector switch on the face of control box containing the electronic circuitry and located at the operator's station on the combine. The mode selector switch also has an "off" position and a spring loaded "raise" position. In the former, all automatic control is inactive, while in the latter position the header is raised independently of the sensors, as when the operator reaches the end of a pass and wishes to elevate the header before turning around. An "override" switch on the control box when "on", and the mode selector switch is "off", alerts the "raise" positions only of the sensors so that if, especially at night while maneuvering, one of the skids of the cutter bar should strike an obstruction, the header will automatically rise to prevent damage. Still another switch on the box shunts the electronic control circuitry entirely and applies power directly to the valve solenoids for testing of the hydraulic circuit. Signal lamps on the box are included to indicate the status of the various modes of the system as well as the positions of the sensors themselves.

The system, when applied to the combine, is set up so that at the "neutral" positions of the sensors, the cutter bar (or other floating portion of its assembly) is maintained less than an inch below the header angle (or other portion of the suspension system fixed to the header). Hence, not until that distance decreases at any sensor location does the latter shift to the "raise" position to lift the header. This allows the bar to drop over nearly its entire floating travel at all sensor locations before all of the latter shift to the "lower" positions to drop the header, thus utilizing the flexibility of the bar to its maximum extent. The ability to automatically maintain the bar so close to the header angle, in contrast to the prior art systems, stems from the fact that the sensors are all operable independently of each other so that the position of each is influenced by the condition at its location only rather than being also influenced by the conditions at all other sensor locations as is the case when the sensors are mechanically tied together. Hence flex of either the bar or its suspension thereabove, especially of the header angle itself when long cutter bars are used, at each sensor location is accommodated independently of the flex of either of the same at any other sensor location. Also the fact there is no mechanical linkage anywhere between the sensors and the hydraulic valve operating the header eliminates any binding or lost motion, whence response to the sensors is always sure and rapid.

Other features and advantages of the present invention will become apparent from the more detailed description which follows and the drawings.

BRIEF DESCRIPTION OF THE DRAWINGS

FIG. 1 is a partial side elevational view of a combine illustrating a typical floating cutter bar mounted beneath the header and showing one of the sensors of the system of the present invention installed in position, certain conventional parts of the header and bar being omitted for the sake of clarity.

FIG. 2 is a diagrammatic, front elevational view of the front of the combine of FIG. 1.

DETAILED DESCRIPTION OF THE PREFERRED EMBODIMENT

Figure 3:
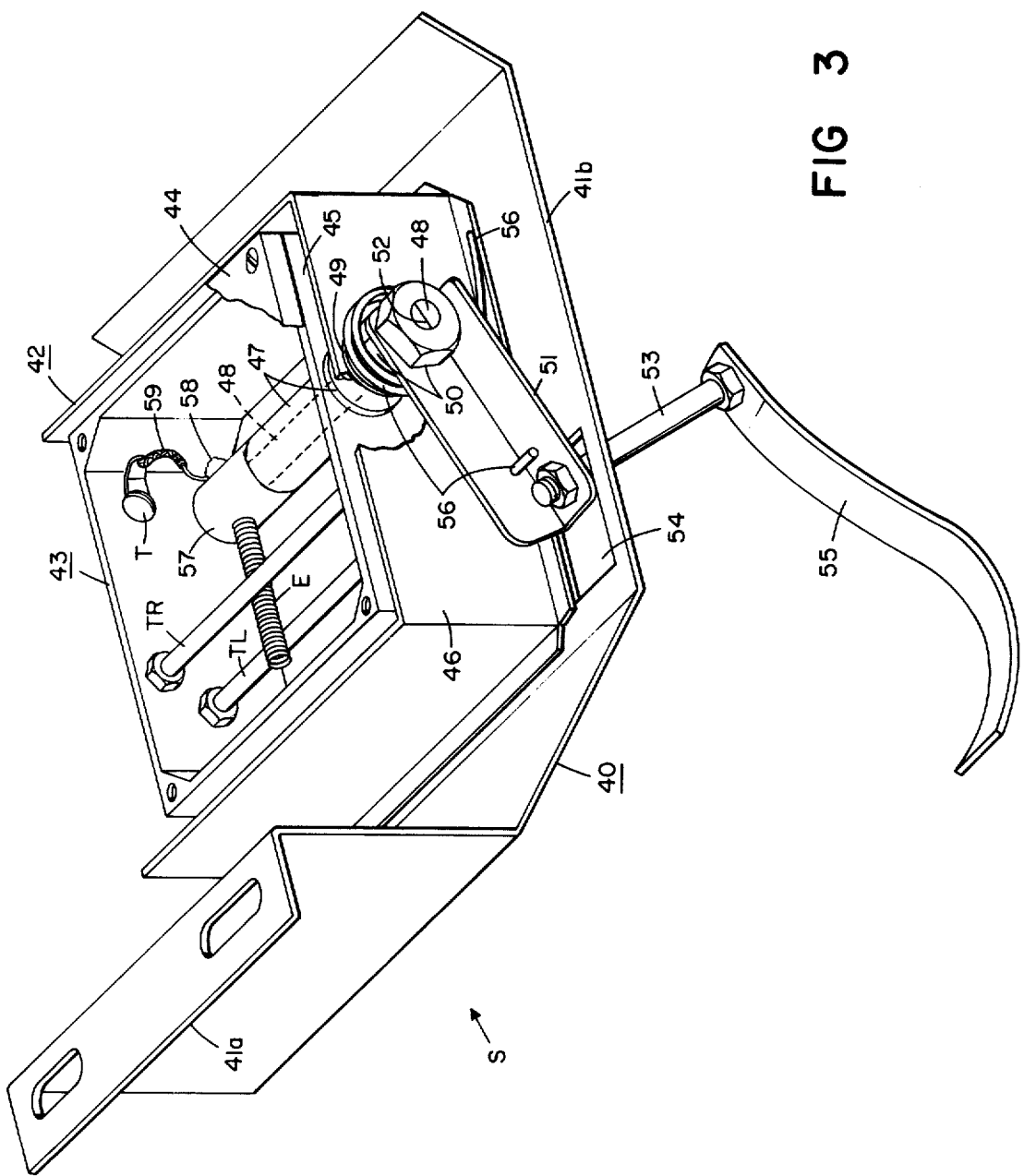
FIG. 3 is an enlarged, isometric view of one of the sensors illustrating its structure.

The combine typically includes a main body 10 which is carried on wheels 11 (only one being shown in FIG. 1) journaled at 11a to the body 10 for travel of the combine across the field or ground. At the front of the main body 10, the grain table or header 12, which contains the cut crop receiving and conveying mechanism (not shown), is pivoted thereto at its upper rear end at 13 so that its elevation with respect to the ground can be adjusted by means of a pair of hydraulic rams 14 (only one being shown in FIG. 1) operatively interposed between the main body 10 and the header 12. Below the floor 15 of the latter, which is ribbed at 15a, is suspended a typical floating cutter bar assembly, generally denoted at 16. The type illustrated is well known and manufactured by J. E. Love Co. of Garfield, Wash., and Windom, Minn. The cutter bar assembly 16 extends transversely of the combine with respect to its normal direction of travel and includes a reciprocating cutter bar 17, flexible in the vertical plane, attached to the forward ends of a number of fore and aft extending, curved angle members 18 laterally spaced from each other along the length of the bar 17. To the bottoms of the forward portions of the members 18 are bolted laterally adjustable, acruate shoes or skids 19 which ride on the ground. The rear ends of the angle members 18 are pivoted at 20 to the lower ends of hangers 21 whose upper ends are vertically adjustably secured to U-clamps 22 along a horizontal, transverse bar 23. The bar 23 in turn is hung on a pair of hangers 24 and vertically adjustably secured thereto by similar clamps (not shown) while the upper ends of the hangers 24 are pivoted to brackets 25 on the rear wall 26 of the header 12. The forward ends of the angle members 18 are hung, as by links of chain 27, from brackets 28 adjustably secured along a transverse header angle 29 which is fixed to the header 12. The chains 27 thus permit the cutter bar 17 to float about the pivots 20 so that the flexibility of the bar 17 can accommodate the terrain over which it passes closely above in order to harvest crops such as soybeans. The lower ends of the brackets 28 abut the angle members 18 to limit the maximum upward travel of the cutter bar 17 relative to the header 12, variations in row spacing being accommodated by latterly moving the skids 19 relative to the angle members 18. In order to reduce the floating weight of the cutter bar assembly 16, long arched springs 30 are connected between the pivots 20 and the brackets 28 and adustably fixed along their lengths to the angle members 18 to the rear of the skids 19 by clamps 31 which are slidable fore or aft to increase or decrease, respectively, the floating weight upon the skids 19.

The number of sensors employed by the present invention depends, of course, upon the length of the cutter bar 17, four to six or more being typical. Six sensors, S1-6 are illustrated (see FIG. 2), one at each end of the bar 17 with the remainder equally spaced therebetween. Each sensors S (see FIGS. 1 and 3) is carried by a wide plate bracket 40 having a forward, angled lip 41a secured to the header angle 29 and providing a supporting floor 41b extending rearwardly spacedly below the header floor 15. The bracket floor 41b of the bracket 40 carries a rectangular metal enclosure 42, open at its top and one side, in which is spacedly fixed a box 43 of dialectic material having a removable cover 44 normally sealed thereto against entrance of dirt. The side wall 45 of the box 43 along the closed side 46 of the enclosure 42 receives a flanged bushing 47 in which is journaled a shaft 48 of dialectic material extending out through the enclosure wall 46 and a thrust washer 49. The outer end of the shaft 48 is threaded to receive a pair of nuts 50, the inner one bearing against the thrust washer 49, between which is clamped one end of an angle lever arm 51 fixed against rotation relative to the shaft 48 by means of a flat 52 on the threaded end of the latter. The arm 51 extends forwardly and to its outer end is bolted the upper end of a post 53, in the form of a metal rod, which passes down through a rectangular aperture 54 in the bracket floor 41b. The lower end of the post 53 is bolted in turn to the rear end of an arcuate feeler 55 of flat spring material which extends forwardly and engages the upper face of one of the skids 19 of the cutter bar assembly 16 (see FIG. 1). A suitable helical spring 56 about the inner nut 50 and operative between the floor 41b and the arm 51 biases the feeler 55 downwardly against the upper face of the skid 19. The inner end of the shaft 48 is integrally formed to provide a cylindrical head 57 diametrically through which pases an electrode E in the form of a flexible wand of conductive metal secured by a screw 58 from which a lead 59 extends to a terminal T on the adjacent side wall of the box 43. The electrode E passes between a horizontal pair of spaced upper and lower terminals TR and TL in the form of rods of conductive metal which span the box 43 parallel to shaft 48 and emerge from the former adjacent the terminal T. As shown in FIG. 3, the action of the spring 56 normally biases the electrode E into contact with the lower electrode TL which is denoted the "lower" position of the sensor S. When the feeler 55 is fully raised against the action of the spring 56, the electrode E contacts the upper electrode TR which is denoted the "raise" position of the sensor S. Between these two positions there is an interval in which the electrode E is in contact with neither electrode TR nor TL, denoted the "neutral" position of the sensor S. Hence each sensor S1-6 is in effect a form of single pole, double throw switch.

The respective "raise" and "lower" terminals TR and TL of the sensors S1-6 are all connected by a 13-wire cable 60 (see FIG. 4) into the control box CB which is mounted at an appropriate location at the combine operator's station for ready access. The cable 60 also includes a common lead VI which is connected to each of the terminals T of the sensors S1-6. A second, two-wire cable 61 extends from the box CB and is connected to the 12 volt battery of the combine which provides the necesssary electrical power for the system. A third, two-pair cable 62 also extends from the box CB, one pair of its leads RS being connected to one solenoid RS, and its other pair of leads LS to the other solenoid RL, of a selective priority flow control valve V (see FIG. 5). The valve V is of a type manufactured by Racine Hydraulics, Inc. of Racine, Wis., and a version of same is shown in U.S. Pat. No. 3,456,560. The valve V is interposed between the hydraulic pump PF, the rams 14 and the combine's regular hydraulic system in the manner shown in FIG. 5. When the solenoid RS is energized, fluid is diverted to the rams 14 to raise the header 12, and when the solenoid LS is energized, the fluid in the rams 14 is allowed to drain therefrom to tank, owing to the weight of the header 12, to lower the latter.

Figure 4:
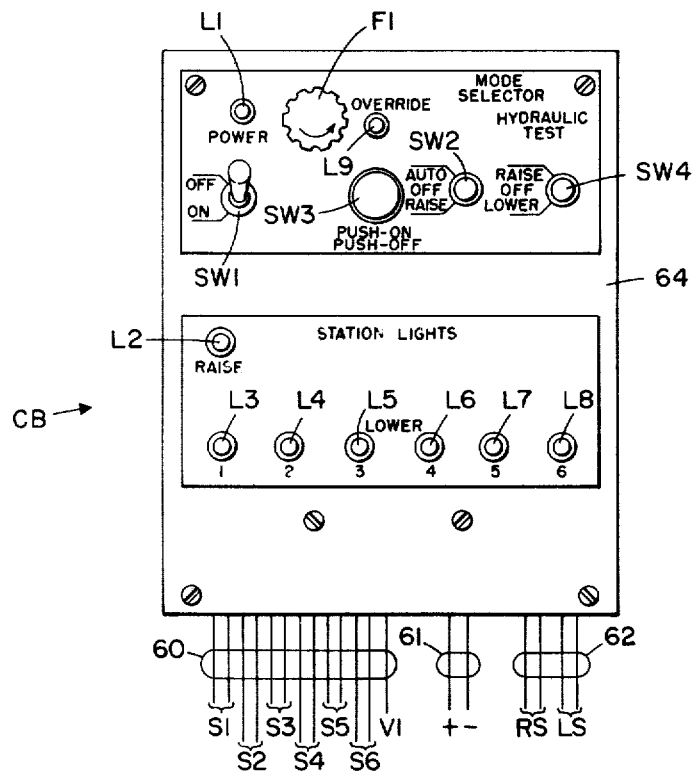
FIG. 4 is a front elevational view of the face of the control box housing the electronic circuitry and mounting the various control switches and indicator lamps for the system of the present invention.
Figure 5:
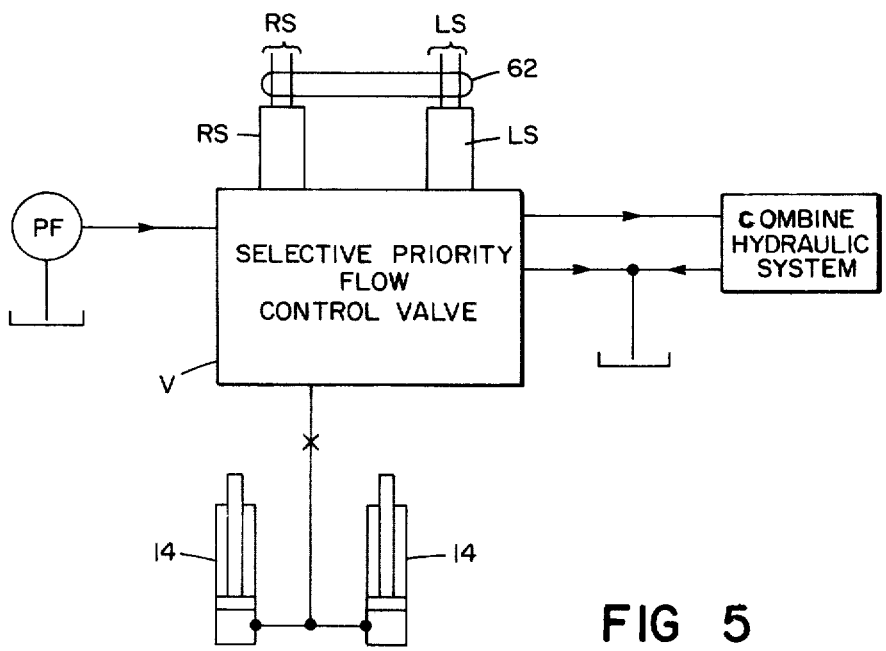
FIG. 5 is a schematic of the manner in which the typical combine hydraulic circuit is adapted for use with the system of the present invention.
Figure 6:
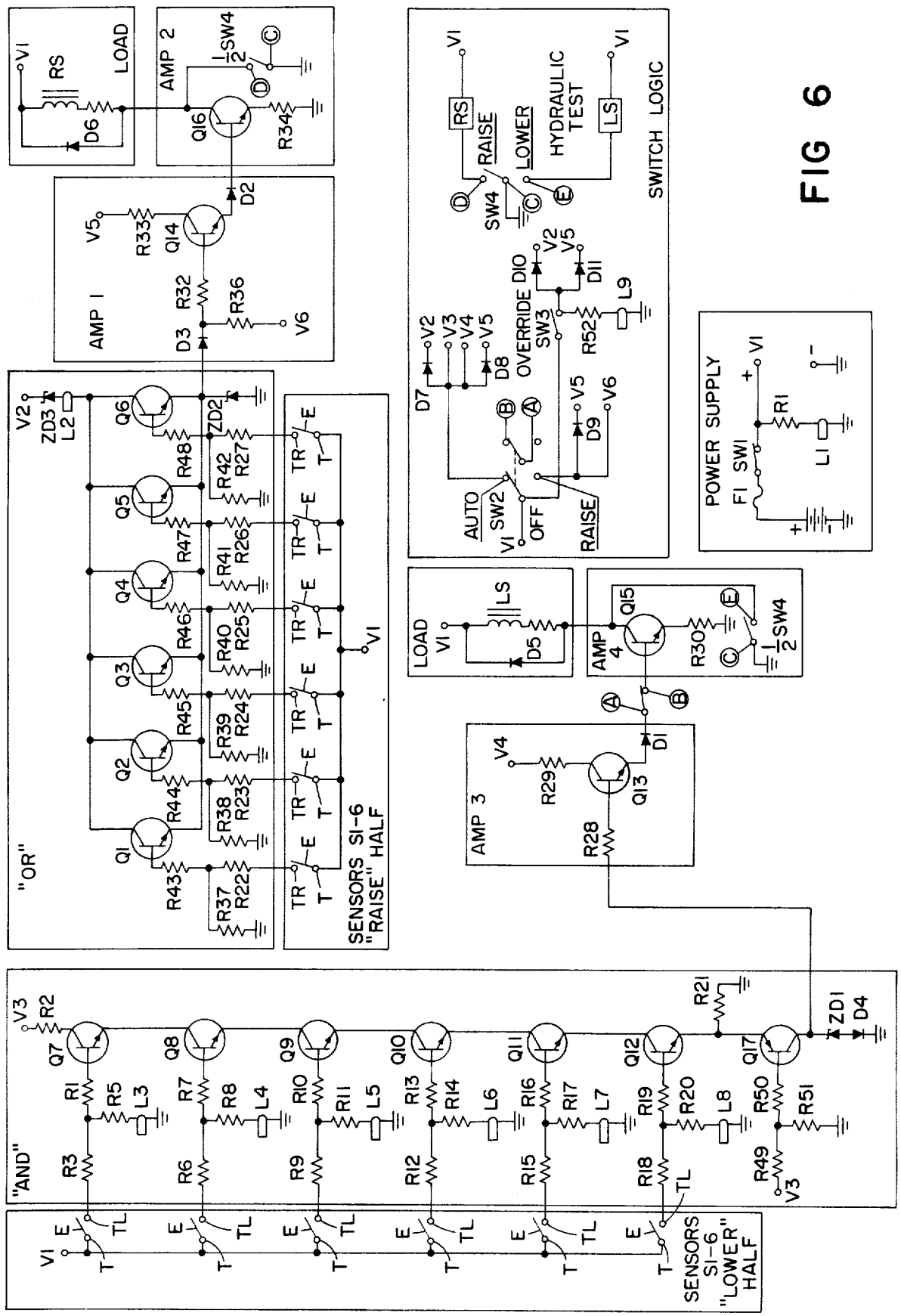
FIG. 6 is a schematic of the electronic circuitry by which the sensors control header height.

Turning now to FIGS. 4 and 6 in particular, when the power switch SW1 on the front panel 64 of the control box CB is closed, as shown in FIG. 6 in the block labeled "Power Supply", power is supplied to the system at all entry points VI through the fuse F1, lighting the signal lamp L1 on the panal 64. The entry points VI include the terminals T of the sensors S1-6, one side of each of the valve solenoids RS and LS, and the circuit making member of a three position double pole, double throw mode selector switch SW2 on the panel 64, and the circuit making member of a single pole, single throw override switch SW3, also on the panel 64. When switch SW2 is in the "auto" position as shown in FIG. 6, power is applied to the entry point V2 of the OR gate or "raise" half of the electronic system comprising the terminals TR of the sensors S1-6 and a bank of transisitors Q1-6 having their emitters and collectors connected in parallel circuit between entry point V2 and a diode circuit ZD3 driving amplifier AMP1 to which power is supplied through switch SW2 and entry point V5, the respective bases of transistors Q1-6 being connected in series with respective one of the six terminals TR of the sensors S1-6. Accordingly, should any one of the sensors S1-6 shift from its "neutral" position to its "raise" position, shown by lighting of the signal lamp L2 on the panel 64 and indicating that the cutter bar 17 at the location of that sensor is less than a predetermined minimum distance from the header angle 29, a signal is given by that sensor to cause its respective transistor Q1-6 to close a circuit through amplifiers AMP1 and AMP2 to the "raise" solenoid RS, whence the rams 14 raise the header 12 until that sensor returns to its "neutral" position. Within the mode selector switch SW2 in the "auto" position, power is also applied to the entry point V3 of the AND gate of the "lower" half of the electronic system comprising the terminals TL of the sensors S1-6 and a bank of transistors Q7-12 having their emitters and collector connected in series circuit between entry point V3 and a diode circuit ZD1-D4 driving amplifier AMP3 through transisitor Q17, amplifier AMP3 being supplied with power through switch SW2 and entry point V4, the respective bases of transistors Q7-12 also being connected in series with the respective ones of the six terminals TL of the sensors S1-6. Thus, only when all of the sensors S1-6 shift from their "neutral" positions to their "lower" positions, shown by the lighting of all of their respective signal lamps L3-8 on the panel 64 and indicating that the cutter bar 17 at the locations of all the sensors S1-6 has reached a predetermined maximum distance from the header angle 29, that is to say, has dropped the maximum amount permitted by the chains 27, signals are given by all the sensors S1–6 causing the transistors Q7–12 to close the circuit through transistor Q17 and amplifiers AMP3 and AMP4 to the "lower" solenoid LS, whence the rams 14 allow the header 12 to drop until at least one of the sensors S1–6 is restored to its "neutral" position.

When the mode selector switch SW 2 is in its "raise" position denoted in FIG. 6, it will be observed that the "lower" half of the system is disconnected from the "lower" solenoid LS owing to the disconnections at the entry points V3 and V4 and between amplifiers AMP3 and AMP4 at points A and B included in the switch SW2. At the same time the action of the OR gate of the "raise" half of the system upon the "raise" solenoid RS is nullified by the disconnection at the entry point V2, but the amplifier AMP1 remains powered through entry point V5 and activated through entry point V6 to energize the "raise" solenoid Rs through amplifier AMP2. The mode selector switch SW2 is spring loaded when in the "raise" position so that as long as the operator's finger holds it in that position the header 12 will rise wholly independently of the sensors S1–6 for reasons to be later explained. When the mode selector switch SW2 is shifted to its mid or "off" position, obviously the entire system is inactive, except that power remains at entry points V1, so that the header 12 will stay at whatever elevation it had immediately beforehand. If the override switch SW3, which is of the push button type, is then or thereafter closed, lighting the signal lamp L9 beside it, power is restored to entry points V2 and V5 so that the "raise" half of the system, including that of the sensors S1–6, is alert, even though the "lower" half of the system, including that of the sensors S1–6, remains inactive. The purpose of the override switch SW3 will also be later explained. Should one wish merely to test the operation of the rams 14, independently of the electronic system, a three position, single pole, double throw switch S4 on the panel 64 is moved to its "raise" and "lower" positions whereby, as indicated in FIG. 6, direct electrical circuits through the power supply are completed to the valve solenoids RS and LS.

The remaining details of the structure and operation of the electronic circuitry will be apparent to those skilled in the art. The following list of components and values may, however, be helpful:

| TRANSISTORS | | | | DIODES | | | |
|---|---|---|---|---|---|---|---|
| Q1 | 2N4124 | Q9 | 2N4124 | D1 | 1N4002 | D6 | 1N5624 |
| Q2 | 2N4124 | Q10 | 2N4124 | D2 | 1N4002 | D7 | 1N4002 |
| Q3 | 2N4124 | Q11 | 2N4124 | D3 | 1N4002 | D8 | 1N4002 |
| Q4 | 2N4124 | Q12 | 2N4124 | D4 | 1N4002 | D9 | 1N4002 |
| Q5 | 2N4124 | Q13 | 2N2219 | D5 | 1N5624 | D10 | 1N4002 |
| Q6 | 2N4124 | Q14 | 2N2219 | | | D11 | 1N4002 |
| Q7 | 2N4124 | Q15 | 2N5496 | | | | |
| Q8 | 2N4124 | Q16 | 2N5496 | | | | |
| | | Q17 | 2N4126 | | | | |

| ZENER DIODES | | | LAMPS (LED) | | | |
|---|---|---|---|---|---|---|
| ZD1 | 4.7; | 1N5230 | L1 | MV5021 | L5 | MV5021 |
| ZD2 | 5.6; | 1N5232 | L2 | MV5021 | L6 | MV5021 |
| ZD3 | 4.7; | 1N5230 | L3 | MV5021 | L7 | MV5021 |
| | | | L4 | MV5021 | L8 | MV5021 |
| | | | | | L9 | MV5021 |

RESISTORS—DESIGN COMPUTED VALUES

| R1 | 1.138k ohms | at ¼ watts | R26 | 290 ohms | at ¼ watts |
|---|---|---|---|---|---|
| R2 | 60 ohms | at ⅛ watts | R27 | 290 ohms | at ¼ watts |
| R3 | 1 ohm | at ¼ watts | R28 | 965 ohms | at ⅛ watts |
| R4 | 11.1k ohms | at ⅛ watts | R29 | 79 ohms | at 2 watts |
| R5 | 570 ohms | at ¼ watts | R30 | 0.303 ohms | at 5 watts |
| R6 | 50 ohms | at ¼ watts | R32 | 742 ohms | at ⅛ watts |
| R7 | 11.1k ohms | at ⅛ watts | R33 | 79 ohms | at 2 watts |
| R8 | 520 ohms | at ¼ watts | R34 | 0.303 ohms | at 5 watts |
| R9 | 100 ohms | at ¼ watts | R36 | 4.0k ohms | at ⅛ watts |
| R10 | 11.1k ohms | at ⅛ watts | R37 | 361 ohms | at ¼ watts |
| R11 | 470 ohms | at ¼ watts | R38 | 361 ohms | at ¼ watts |
| R12 | 150 ohms | at ¼ watts | R39 | 361 ohms | at ¼ watts |
| R13 | 11.1k ohms | at ⅛ watts | R40 | 361 ohms | at ¼ watts |
| R14 | 420 ohms | at ¼ watts | R41 | 361 ohms | at ¼ watts |
| R15 | 200 ohms | at ¼ watts | R42 | 361 ohms | at ¼ watts |
| R16 | 11.1k ohms | at ⅛ watts | R43 | 11.1k ohms | at ⅛ watts |
| R17 | 370 ohms | at ¼ watts | R44 | 11.1k ohms | at ⅛ watts |
| R18 | 250 ohms | at ¼ watts | R45 | 11.1k ohms | at ⅛ watts |
| R19 | 11.1k ohms | at ⅛ watts | R46 | 11.1k ohms | at ⅛ watts |
| R20 | 320 ohms | at ¼ watts | R47 | 11.1k ohms | at ⅛ watts |
| R21 | 6.8k ohms | at ⅛ watts | R48 | 11.1k ohms | at ⅛ watts |
| R22 | 290 ohms | at ¼ watts | R49 | 324 ohms | at ¼ watts |
| R23 | 290 ohms | at ¼ watts | R50 | 11.1k ohms | at ⅛ watts |
| R24 | 290 ohms | at ¼ watts | R51 | 328 ohms | at ¼ watts |
| R25 | 290 ohms | at ¼ watts | R52 | 1.138k ohms | at ¼ watts |

After its application to the combine, the system is adjusted so that the sensors S1–6 are approximately at the midpoint of their "neutral" positions when the cutter bar 17 is about 5/8 of an inch or so below the brackets 28 at all sensor locations. After the power switch SW1 is turned on, and with the mode selector switch SW2 and override switch SW3 in their "off" positions and the combine's engine started, the operation of the hydraulic rams 14 can be checked by moving the hydraulic test switch SW4. Assuming that the header 12 is in an elevated position, then when the mode selector switch SW2 is moved to its "auto" postion all of the "lower" signal lamps L3–8 should light, since the sensors S1–6 will all be in their "lower" positions owing to the cutter bar 17 hanging on its chain 27, whereupon the system will lower the header 12 until the skids 19 touch the ground and, provided the ground is level, the sensors S1–6 all reach their "neutral" positions, at which point all of the signal lamps L3–8 should go out. The combine will then be ready for operation. As the machine proceeds across the field, various of the lamps L3–8 may go on and off, signalling that their respective sensor or sensors are in and out of their "lower" positions owing to fall and rise of the cutter bar 17 at those sensor locations. But not until all lamps L3–8 are on together will the header 12 be lowered, the setting of the "neutral" positions of the sensors S1–6 so that the cutter bar 17 is closely below the header angle 29 thus permitting utilization of the maximum possible amount of fall in the floating suspension of the bar 17 before the header 12 need be lowered. On the other hand, should the bar 17 at any one of the sensors S1–6 rise enough to move that sensor to its "raise" position, the "raise" signal lamp L2 will light and the system will elevate the header 12 until the "neutral" position of that sensor is restored, whereupon the lamps L 2 will go out. When the end of a pass across the field is reached and the operator wishes to turn around, he flicks the mode selector switch SW2 to its "raise" position and holds it there until the system raises the header 12 enough so that the cutter bar 17 will be well clear of ridges, ditches or other obstructions during the turn. Then the switch SW2 can be moved to its "off" position to keep the header at that elevation. After the turn is finished, the operator returns the switch Sw2 to the "auto" position whereupon the header 12 will automatically lower until at least one of the sensors S1–6 is restored to its "neutral" position so that a new pass can be begun. When working at night especially, and the operator wishes to avoid injury to the cutter bar 17 should it inadvertently strike some obstruction when the mode selector switch SW2 is in the "off" position, the override circuit can be activated by pushing the override switch SW3, thus automatically causing the sensors S1–6 to raise the header 12, no matter what its height at the time, in the event one of the skids 19 runs into an unseen obstacle. The electronic "logic" by which the header 12 is controlled in the foregoing circumstances will be clear from the previously described operation of the circuitry of FIG. 6.

A few other aspects of the present invention remain to be noted. The use of transistors requires only very low current, about 20 milliamperes, through the sensors S1–6 for the system to function so that burning of their contacts is virtually eliminated and their long life assured. Also, the transistors, since they take a certain time to turn "on" and "off", produce a kind of "damping" effect as opposed to a system using, for example, only simple switches or relays which would probably produce too "jumpy" movements of the header 12. Employment of solid state components reduces standby power consumption to a minimum, as well as providing a relatively small, compact "package" for the system which is readily handled and installed, all in contrast to the much bigger, more piecemeal and largely mechanical systems of the prior art. Finally, it is worth pointing out that the system per se of the present invention is also readily adapted to agricultural machines using other types of working means which float on or above the ground as well as to those machines using non-floating such means in which the distance of the latter from the ground must be sensed at various locations.

Though the present invention has been described in terms of a particular embodiment, being the best mode known of carrying out the invention, it is not limited to that embodiment alone. Instead, the following claims are to be read as encompassing all adaptations and modifications of the invention falling within its scope and spirit.

I claim:

1. In an agricultural machine including a main body having means for transporting the body over agricultural terrain and an adjustable portion movable with respect to the main body for raising and lowering movements relative to the terrain independently of movement of the main body along the terrain, the adjustable portion including working means for operation closely above the terrain and disposed extensively along a direction transversely of that of the travel of the machine along the terrain, the working means depending from and being floatably connected to the adjustable portion for raising and lowering movements relative thereto between predetermined limits independently of said movements of the adjustable portion and the main body, and power means for effecting said movements of the adjustable portion, the power means having electrically activated control means for operating the same, the improvement comprising: a plurality of sensing means carried by one of the adjustable portion and the working means and spaced from each other along said transverse direction, the sensing means being responsive to the distance of the working means from the adjustable portion at selected points along said transverse direction and operable independently of each other, and an electrical and electronic control circuit electrically interconnecting each sensing means and the power control means for automatically activating the latter in response to signals provided by the sensing means, the sensing means having a first set of positions providing a first set of signals for activating the power control means to effect said raising movement of the adjustable portion in the event the distance of the working means at one of said selected points therealong is less than a predetermined minimum from the adjustable portion as the machine travels along the terrain, the sensing means having a second set of positions providing a second set of signals for activating the power control means to effect said lowering movement of the adjustable portion in the event the distance of the working means at all of a plurality of said selected points therealong is greater than a predetermined maximum from the adjustable portion as the machine travels along the terrain.

2. The combination of claim 1 wherein the sensing means have a third set of positions intermediate the first and second sets of positions corresponding to the difference between said minimum and maximum predetermined distances and providing a null set of signals whereby the power control means are not activated by the sensing means.

3. The combination of claim 2 wherein the electrical and electronic control circuit includes a plurality of first circuit making means interconnecting respective ones of the sensing means and the power control means in circuit parallel relation to allow said first set of signals to activate the power control means, and a plurality of second circuit making means interconnecting respective ones of the sensing means and the power control means in circuit series relation to allow said second set of signals to activate the power control means.

4. The combination of claim 3 wherein the sensing means include a plurality of circuit making members having first positions providing said first set of signals, second positions providing said second set of signals, and third positions intermediate the first and second positions providing said null set of signals.

5. The combination of claim 4 wherein each of the sensing means includes one of the circuit making members having said first, second and third positions, each sensing means comprising a single pole, double throw switch.

6. The combination of claim 3 including switch means for optionally barring the second set of positions of the sensing means from activating the power control means while allowing the first set of positions of the sensing means to activate the power control means.

7. The combination of claim 4 wherein the first and second circuit making means respectively include first and second sets of solid state devices associated with the circuit making members, each of the devices having a base, an emitter and a collector, the emitters and collectors of the first set of devices being connected in circuit parallel relation to each other and in circuit series relation between an electric power source and the power control means, the respective bases of said set of devices being connected in circuit series relation with the first positions of respective ones of the circuit making members, the emitters and collectors of the second set of devices being connected in circuit series relation to each other and between an electric power source and the power control means, the respective bases of the second set of devices being connected in circuit series relation with the second positions of respective ones of the circuit making members.

8. The combination of claim 7 including amplifier means interposed in circuit series relation between the output of each of said sets of devices and the power control means.

9. The combination of claim 4 wherein the sensing means are fixed to the adjustable portion, each of the sensing means having an extending arm in operative engagement with the working means and including one of said circuit making members operatively associated with the arm providing said first, second and third positions thereof responsive to raising and lowering movements of the working means relative to the adjustable portion.

10. The combination of claim 9 wherein the working means is flexible in a vertical plane relative to the terrain.

11. For use with an agricultural machine including a main body having means for transporting the body over agricultural terrain and an adjustable portion movable with respect to the main body for raising and lowering movements relative to the terrain independently of movement of the main body along the terrain, the adjustable portion including working means for operation above the terrain and disposed along a direction transversely of that of travel of the machine along the terrain, and power means for effecting said movements of the adjustable portion, the power means having electrically activated control means for operating the same, a control system for automatically effecting said movements of the adjustable portion when the distance between the adjustable portion and one of the working means and the terrain becomes respectively less than a predetermined minimum or greater than a predetermined maximum as the machine moves along the terrain, the system comprising: a plurality of self contained individual sensing means adapted to be fixed relative to the adjustable portion at spaced locations along said transverse direction, each of the sensing means being adapted to be responsive to said distance at a selected point along said transverse direction and operative independently of each of the other of the sensing means, and a self contained electrical and electronic control circuit electrically interconnectable directly to each sensing means and the power control means for automatically activating the latter in response to signals provided by the sensing means, the sensing means having a first set of positions effective to provide a first set of signals to the control circuit when said distance at one of said selected points is less than said minimum, the sensing means having a second set of positions effective to provide a second set of signals to the control circuit when said distance at all of said selected points is greater than said maximum, the sensing means having a third set of positions intermediate the first and second sets effective to provide a null set of signals to the control circuit when said distance is between said minimum and maximum.

12. The system of claim 11 wherein the electrical and electronic control circuit includes a plurality of circuit making means connectable as aforesaid with respective ones of the sensing means in circuit parallel relation to receive said first set of signals, and a plurality of second circuit making means connectable as aforesaid with respective ones of the sensing means in circuit series relation to receive said second set of signals.

13. The system of claim 12 wherein each sensing means includes a circuit making member having first, second and third positions, the first positions of the circuit making members being effective to provide the first set of signals and the second positions the second set of signals, the third positions being intermediate the first and second positions and effective to provide the third set of signals.

14. The system of claim 13 wherein the first and second circuit making means respectively include first and second sets of solid state devices connectable as aforesaid with the circuit making members, each of the devices having a base, an emitter and a collector, the emitters and collectors of the first set of devices being connected in circuit parallel relation to each other and in series with means for amplifying the output of said set, the respective bases of said set being connectable as aforesaid in circuit series relation with the first positions of respective ones of the circuit making members, the emitters and collectors of the second set of devices being connected in circuit series relation to each other and with means for amplifying the output of said set, the respective bases of said set being connectable as aforesaid in circuit series relation with the second positions of respective ones of the circuit making members.

15. The system of claim 14 including switch means for optionally rendering the second positions of the circuit making members ineffective upon the system while retaining the effectiveness of the first set of the circuit making members upon the system.

* * * * *